(12) United States Patent
Nozawa

(10) Patent No.: US 8,704,795 B2
(45) Date of Patent: Apr. 22, 2014

(54) TOUCH PANEL AND TOUCH PANEL DISPLAY DEVICE

(75) Inventor: Junichi Nozawa, Kirishima (JP)

(73) Assignee: Kyocera Corporation, Kyoto (JP)

( * ) Notice: Subject to any disclaimer, the term of this patent is extended or adjusted under 35 U.S.C. 154(b) by 465 days.

(21) Appl. No.: 12/865,257

(22) PCT Filed: Jan. 28, 2009

(86) PCT No.: PCT/JP2009/051327
§ 371 (c)(1),
(2), (4) Date: Jul. 29, 2010

(87) PCT Pub. No.: WO2009/096411
PCT Pub. Date: Aug. 6, 2009

(65) Prior Publication Data
US 2011/0012865 A1    Jan. 20, 2011

(30) Foreign Application Priority Data

Jan. 30, 2008    (JP) .................................. 2008-018677

(51) Int. Cl.
*G06F 3/045* (2006.01)
(52) U.S. Cl.
USPC ........................................ 345/174; 178/18.05
(58) Field of Classification Search
USPC .......... 345/173–178; 178/18.01–18.09, 18.11
See application file for complete search history.

(56) References Cited

U.S. PATENT DOCUMENTS 6,380,673 B1 * 4/2002 Sekiya et al. ................. 313/504
6,721,019 B2   4/2004 Kono et al.

FOREIGN PATENT DOCUMENTS

JP    2002-41231 A    2/2002
JP    2006-11522 A    1/2006

* cited by examiner

*Primary Examiner* — Stephen Sherman
(74) *Attorney, Agent, or Firm* — Birch, Stewart, Kolasch & Birch, LLP

(57) ABSTRACT

A touch panel includes a first substrate having a first resistance film, a second substrate having a second resistance film and a wiring electrode. The first resistance film and the second resistance film are arranged to face each other. A conductive connection member is interposed between the first substrate and the second substrate and electrically connects the first resistance film to the first wiring electrode. The touch panel further-includes auxiliary electrodes partially covered with the first wiring electrode and in contact with the conductive connection member. The resistivity of the auxiliary electrodes in the contact surface with the conductive connection member is lower than the resistivity of the first wiring electrode in the contact surface with the conductive connection member.

20 Claims, 10 Drawing Sheets

TOUCH PANEL AND TOUCH PANEL DISPLAY DEVICE

TECHNICAL FIELD

The present invention relates to a touch panel arranged on a display screen of, for example, a liquid crystal display or the like, a portion of the touch panel being pressed by a user with his/her finger, a pen, or the like in accordance with an instruction on the display screen so that the user can input information, and also relates to a touch panel display device.

BACKGROUND ART

Some touch panel display devices include a touch panel that detects input coordinates based on changes in resistance by the pressing operation, and one of such touch panel display devices is disclosed in, for example, Patent Document 1.

A screen input type display device disclosed in Patent Document 1 is configured such that a first base substrate formed of a polyethylene terephthalate film and a second base substrate made of glass are arranged to face each other. The first base substrate has, on a surface thereof facing the second base substrate, a first resistance film made of ITO and a first wiring electrode electrically connected to the first resistance film. The second base substrate has, on a surface thereof facing the first base substrate, a second resistance film made of ITO, a second wiring electrode electrically connected to the second resistance film, and an inter-substrate connection wiring electrode electrically connected to the first resistance film. The first wiring electrode and the inter-substrate connection wiring electrode are electrically connected through a conductive adhesive member. The conductive adhesive member includes a pressure-sensitive adhesive material and conductive particles dispersed in the pressure-sensitive adhesive material. Further, each of the second wiring electrode and the inter-substrate connection wiring electrode is formed by applying a conductive paste such as a silver paste by printing.

In the screen input type display device of Patent Document 1, the inter-substrate connection wiring electrode, which uses a silver paste (obtained by dispersing silver particles in a resin), has a relatively larger resistance than metal wiring made of, for example, aluminum. Thus, in the screen input type display device of Patent Document 1, the large thickness of the silver paste is required in order to reduce variations in applied voltage which are caused by the relatively large resistance. It is therefore difficult to make the screen input type display device of Patent Document 1 sufficiently thin.

In the screen input type display device of Patent Document 1, furthermore, even if metal wiring of aluminum having a relatively low resistance is used instead of a silver paste, an oxide film is formed on the surface of the metal wiring, which may cause unstable electrical connection between the metal wiring (inter-substrate connection wiring electrode) and the first wiring electrode.

Patent Document 1: Japanese Unexamined Patent Application Publication No. 2002-41231

SUMMARY OF INVENTION

The present invention has been made in view of such a situation, and an object thereof is to provide a touch panel and a touch panel display device that can be made thinner and that can provide stable electrical connectivity between an inter-substrate connection wiring electrode and an electrically connected member thereto (such as a resistance film or a wiring electrode).

A touch panel according to an aspect of the present invention includes a first base substrate including a first resistance film, a second base substrate including a second resistance film and a wiring electrode, the first resistance film and the second resistance film being arranged so as to face each other, and a conductive connection member that is disposed between the first base substrate and the second base substrate and that electrically connects the first resistance film to the wiring electrode. The touch panel further includes an auxiliary electrode that is partially covered by the inter-substrate connection wiring electrode and that is in contact with the conductive connection member. A resistivity of the auxiliary electrode at a surface thereof in contact with the conductive connection member is smaller than a resistivity of the wiring electrode at a surface thereof in contact with the conductive connection member.

A touch panel display device according to an aspect of the present invention includes a display panel, and the touch panel, in which the first base substrate or the second base substrate is arranged so as to face the display panel.

A touch panel according to an aspect of the present invention further includes an auxiliary electrode that is partially covered by the wiring electrode and that is in contact with the conductive connection member. Further, a resistivity of the auxiliary electrode at a contact surface thereof in contact with the conductive connection member is smaller than a resistivity of the wiring electrode at a contact surface thereof in contact with the conductive connection member. That is, in the touch panel, the wiring electrode and the conductive connection member (and therefore the first resistance film) can be electrically connected using the auxiliary electrode having a relatively low resistivity at the contact surface in contact with the conductive connection member. In the touch panel, therefore, for example, an aluminum film having a low resistance while having an oxide film formed on a surface thereof can be used as the wiring electrode. Thus, the touch panel can be made thinner than that in which, for example, a silver paste is used as the wiring electrode. In the touch panel, furthermore, stable electrical connectivity between the wiring electrode and the first resistance film can be provided.

A touch panel display device according to an aspect of the present invention includes the touch panel described above, and can therefore achieve advantages similar to the advantages of the touch panel.

BEST MODE FOR CARRYING OUT THE INVENTION

FIG. 1 is an exploded perspective view illustrating a schematic configuration of a touch panel X according to an embodiment of the present invention. FIG. 2 is a cross-sectional view taken along the line II-II of FIG. 1. FIG. 3 is a cross-sectional view taken along the line III-III of FIG. 1. FIG. 4 is a cross-sectional view taken along the line IV-IV of FIG. 1. FIG. 5 is a cross-sectional view taken along the line V-V of FIG. 1.

The touch panel X includes a first base substrate 10, a second base substrate 20, and a conductive connection member 30.

The first base substrate 10 includes a transparent insulating substrate 11 and a first resistance film 12. In the present embodiment, the whole first base substrate 10 has flexibility, and has a substantially rectangular shape when viewed in plan. The shape of the first base substrate 10, when viewed in plan, is not limited to a rectangular shape, and may be any other shape.

The transparent insulating substrate 11 plays a role of supporting the first resistance film 12, and has optical transparency in the direction perpendicular to the principal surface thereof, as well as electrical insulation. In the present embodiment, the term "optical transparency" means transmission of visible light. Examples of the material of the transparent insulating substrate 11 may include optically transparent glass and optically transparent plastic. Among these examples, optically transparent glass is preferable in view of heat resistance. If optically transparent glass is used as the material of the transparent insulating substrate 11, preferably, the thickness of the transparent insulating substrate 11 is set to 0.1 mm or more and 0.3 mm or less in order to ensure sufficient shape stability and flexibility.

The first resistance film 12 contributes to the detection of the potential at a contact point of the after-mentioned second base substrate 20 with a second resistance film 22, and has optical transparency in the direction perpendicular to the principal surface thereof. In the present embodiment, the first resistance film 12 is formed so as to extend over substantially the entire principal surface of the transparent insulating substrate 11 on the arrow B direction side (bottom surface). The first resistance film 12 has a resistance value of, for example, 200 ohms per square or more and 1500 ohms per square or less. In the present embodiment, in view of the increase in resistance, the thickness of the first resistance film 12 is set to $2.0 \times 10^{-2}$ μm or less. Examples of the material of the first resistance film 12 may include optically transparent conductive materials such as ITO (Indium Tin Oxide), ATO (Antimony Tin Oxide), tin oxide, and zinc oxide.

The second base substrate 20 includes a transparent insulating substrate 21, the second resistance film 22, first wiring electrodes 23 and 24, auxiliary electrodes 25 and 26, second wiring electrodes 27 and 28, and dot spacers 29. The second base substrate 20 has an external conduction region 20a that is a region electrically connected to a conduction member (for example, an FPC (Flexible Printed Circuit)) which is not illustrated in the figure. In the present embodiment, the second base substrate 20 has a rectangular shape when viewed in plan, and is arranged so as to face the first base substrate 10. The shape of the second base substrate 20, when viewed in plan, is not limited to a rectangular shape, and may be any other shape.

The transparent insulating substrate 21 plays a role of supporting the second resistance film 22, the first wiring electrodes 23 and 24, the auxiliary electrodes 25 and 26, the second wiring electrodes 27 and 28, and the dot spacers 29, and has optical transparency in the direction perpendicular to the principal surface thereof, as well as electrical insulation. Examples of the material of the transparent insulating substrate 21 may include optically transparent glass and optically transparent plastic. Among these examples, optically transparent glass is preferable in view of heat resistance. If optically transparent glass is used as the material of the transparent insulating substrate 21, preferably, the thickness of the transparent insulating substrate 21 is set to 0.7 mm or more in order to ensure sufficient shape stability.

The second resistance film 22 contributes to the detection of the potential at a contact point of the first base substrate 10 with the first resistance film 12, and has optical transparency in the direction perpendicular to the principal surface thereof. In the present embodiment, the second resistance film 22 is formed on the principal surface of the transparent insulating substrate 21 on the arrow A direction side (top surface), and the region where the second resistance film 22 is formed is located, when viewed in plan, in the region where the first resistance film 12 is formed. The optical transparency and electrical resistance value requirements of the second resistance film 22 are similar to those of the first resistance film 12. Further, the material of the second resistance film 22 may be similar to that of the first resistance film 12.

The first wiring electrodes 23 and 24 play a role of applying a voltage to the first resistance film 12. An end of the first wiring electrode 23 is located in an end region on the arrow C direction side of a connection region defined by the conductive connection member 30 described below, and the other end thereof is located in the external conduction region 20a of the second base substrate 20. An end of the first wiring electrode 24 is located in an end region on the arrow D direction side of the connection region defined by the conductive connection member 30 described below, and the other end thereof is located in the external conduction region 20a of the second base substrate 20.

Preferably, the resistance value between both ends of each of the first wiring electrodes 23 and 24 is set to 0.01 times or less the resistance value between both ends of the first resistance film 12 in view of the detection accuracy of the touch panel X. Here, the term "between both ends of the first resistance film 12" means the range from one end to the other end of a region of the first resistance film 12 which faces each of the first wiring electrodes 23 and 24. In the present embodiment, each of the first wiring electrodes 23 and 24 is formed of a metal thin film (line width: 0.5 mm or more and 2 mm or less, thickness: 0.5 μm or more and 2 μm or less) in view of hardness and shape stability. Examples of the metal thin film may include an aluminum film, an aluminum alloy film, a multilayer film of a chromium film and an aluminum film, and a multilayer film of a chromium film and an aluminum alloy film. If the first resistance film 12 is made of ITO, in view of adhesiveness with ITO, the metal thin film is preferably a multilayer film of a chromium film and an aluminum film in which the chromium film is placed between ITO and the aluminum film or a multilayer film of a chromium film and an aluminum alloy film in which the chromium film is placed between ITO and the aluminum alloy film. Examples of a method for forming a metal thin film may include sputtering, evaporation, and chemical vapor deposition (CVD).

In the touch panel X, if the metal thin film is an aluminum film, an aluminum alloy film, a multilayer film of a chromium film and an aluminum film, or a multilayer film of a chromium film and an aluminum alloy film, the ease of thin film formation and the ease of thin film processing (such as patterning) can be increased. In addition, the wiring resistance can be relatively reduced.

The auxiliary electrodes 25 and 26 assist the role of the first wiring electrodes 23 and 24. The auxiliary electrodes 25 and 26 are partially covered by the first wiring electrodes 23 and 24, and are in contact with the conductive connection member 30 described below. In the present embodiment, the auxiliary electrodes 25 and 26 are formed along the entire regions where the first wiring electrodes 23 and 24 are electrically connected to the first resistance film 12. Further, in the present embodiment, the auxiliary electrodes 25 and 26 are entirely covered by the first wiring electrodes 23 and 24 and the conductive connection member 30. The resistivity of the auxiliary electrodes 25 and 26 at contact surfaces 25a and 26a in contact with the conductive connection member 30 is set to be smaller than the resistivity of the first wiring electrodes 23 and 24 at contact surfaces 23a and 24a in contact with the conductive connection member 30. As illustrated in FIGS. 3 and 5, in the present embodiment, the distance D1 from the second resistance film 22 to the contact surfaces 25a and 26a is set to be larger than the distance D2 from the second resistance film 22 to the contact surfaces 23a and 24a. In the present embodiment, the area of the contact surfaces 25a and 26a is set to be greater than or equal to the area of the contact surfaces 23a and 24a. The material of the auxiliary electrodes 25 and 26 is not specifically limited to any material as long as the resistivity on the contact surfaces 25a and 26a is smaller than the resistivity on the contact surfaces 23a and 24a. In view of the increased manufacturing efficiency, however, the same material as that of the second resistance film 22 is preferable. ITO is particularly preferable in view of the reduction in the increase in resistivity due to oxidation.

The second wiring electrodes 27 and 28 play a role of applying a voltage to the second resistance film 22. An end of the second wiring electrode 27 is connected to the end of the second resistance film 22 on the arrow E direction side, and the other end thereof is located in the external conduction region 20a of the second base substrate 20. An end of the second wiring electrode 28 is connected to the end of the second resistance film 22 on the arrow F direction side, and the other end thereof is located in the external conduction region 20a of the second base substrate 20.

Preferably, the resistance value between both ends of each of the second wiring electrodes 27 and 28 is set to 0.01 times or less the resistance value between both ends of the second resistance film 22 in view of the detection accuracy of the touch panel X. Here, the term "between both ends of the second resistance film 22" means the range from one end to the other end of the region of the second resistance film 22 which faces each of the second wiring electrodes 27 and 28. In the present embodiment, similarly to the first wiring electrodes 23 and 24, each of the second wiring electrodes 27 and 28 is formed of a metal thin film (line width: 0.5 mm or more and 2 mm or less, thickness: 0.5 mm or more and 2 mm or less). The metal thin film may be similar to the metal thin film forming each of the first wiring electrodes 23 and 24.

The dot spacers 29 play a role of preventing unwanted contact between the first resistance film 12 and the second resistance film 22 in a region other than a predetermined position when (inputting information for) bringing the first resistance film 12 and the second resistance film 22 into contact with each other at the predetermined position. In the present embodiment, the dot spacers 29 are arranged at substantially constant intervals in the arrow CD direction and the EF direction on the transparent insulating substrate 21.

Preferably, the dot spacers 29 are barely visible while achieving the function of preventing unwanted contact between the first resistance film 12 and the second resistance film 22, and are formed into, for example, a dome shape with a diameter of 40 μm or less and a height of 1.0 μm or more and 3.5 μm or less. Further, a distance (arrangement pitch) between adjacent dot spacers 29 in the arrow CD direction or in the arrow EF direction is set to, for example, 2 mm or more and 4 mm or less.

The dot spacers 29 are not necessarily formed on the transparent insulating substrate 21, and may be formed on the transparent insulating substrate 11. Further, the dot spacers 29 may not necessarily be arranged at substantially constant intervals in the arrow CD direction and the arrow EF direction.

Examples of the material of the dot spacers 29 may include thermosetting resins and ultraviolet-curable resins. Thermosetting resins are preferable in view of environmental resistance, and ultraviolet-curable resins are preferable in view of manufacturing efficiency. Examples of the thermosetting resins may include epoxy resins, unsaturated polyesters, urea resins, melamine resins, and phenolic resins. Examples of the ultraviolet-curable resins may include acrylic resins and epoxy resins.

The conductive connection member 30 plays roles of bonding the first base substrate 10 and the second base substrate 20 together while providing electrical conduction between the first resistance film 12 and the first wiring electrodes 23 and 24 and between the first resistance film 12 and the auxiliary electrodes 25 and 26. In the present embodiment, in view of the sealing between the first resistance film 12 and the second resistance film 22, the connection region defined by the conductive connection member 30 is disposed so as to surround the second resistance film 22. However, any other configuration may be used.

In the present embodiment, the conductive connection member 30 includes first particles 31, second particles 32, and an adhesive material 33.

The first particles 31 play a role of electrically connecting the first resistance film 12 to the first wiring electrodes 23 and 24 and the auxiliary electrodes 25 and 26. The first particles 31 have a larger particle diameter than the second particles 32 described below, and are more compressed than the second particles 32 between the first base substrate 10 and the second base substrate 20. That is, the first particles 31 have conductivity and have a higher elastic deformation ratio than the second particles 32. In the present embodiment, each of the first particles 31 contains a plastic ball and a conductor material (for example, gold, nickel, or the like) that covers the surface of the plastic ball. In the present embodiment, spherical particles are used as the first particles 31 in view of suppressing damage to the first resistance film 12, the first wiring electrodes 23 and 24, the auxiliary electrodes 25 and 26, and the like that are in contact with the first particles 31. However, the shape is not limited to that described above, and, for example, polyhedral particles may also be used. While the present embodiment is described using the first particles 31 having a particle diameter of 13.5 μm, the particle diameter is not limited to the size given above, and may be any size within a range that the first particles 31 is not excessively elastically deformed while a sufficient contact area with the first resistance film 12, the first wiring electrodes 23 and 24, and the auxiliary electrodes 25 and 26 is ensured.

The second particles 32 play a role of defining the separation between the first base substrate 10 and the second base substrate 20, and have a smaller particle diameter than the first particles 31 and a smaller elastic deformation ratio than the first particles 31. In the present embodiment, in view of ease to define the separation between the first base substrate 10 and the second base substrate 20, silica spheres (spherical particles mainly made of silicon dioxide) are used as the second particles 32. However, the material is not limited to that described above, and glass fiber or the like may also be used. In the present embodiment, spherical particles are used as the second particles 32 in view of suppressing damage to the first resistance film 12, the first wiring electrodes 23 and 24, the auxiliary electrodes 25 and 26, and the like that are in contact with the second particles 32. However, the shape is not limited to that described above, and, for example, polyhedral particles may also be used. While the present embodiment is described using the second particles 32 having a particle diameter of 12 μm, the particle diameter size is not limited to that given above.

The adhesive material 33 plays a role of bonding the first base substrate 10 and the second base substrate 20 together, and contains the first particles 31 and the second particles 32. Examples of the adhesive material 33 may include thermosetting resins such as epoxy-based resins and ultraviolet-curable resins such as acryl-based resins. Among these examples, thermosetting resins are preferable in view of working efficiency in the manufacturing process.

Here, an example of a method for connecting the first base substrate 10 to the second base substrate 20 using the conductive connection member 30 is described. As the material of the adhesive material 33 that constitutes the conductive connection member 30, a thermosetting resin is used.

First, the conductive connection member 30 is printed in a predetermined region on the top surface of the second base substrate 20 (the surface where the first wiring electrodes 23 and 24 and the auxiliary electrodes 25 and 26 are formed). In the present embodiment, as is clearly apparent in FIG. 1, the predetermined region is a region located so as to surround the second resistance film 22.

Then, as illustrated in FIG. 6A, after the first base substrate 10 is aligned with the second base substrate 20 on which the conductive connection member 30 is printed, the first base substrate 10 and the second base substrate 20 are bonded to each other through the conductive connection member 30 to produce a bonded structure.

Then, as illustrated in FIG. 6B, the first base substrate 10 and the second base substrate 20 in the produced structure are pressed in such a manner that the first base substrate 10 and the second base substrate 20 approach each other. In the present embodiment, the first base substrate 10 and the second base substrate 20 are pressed until the second particles 32 are brought into contact with both the first base substrate 10 and the second base substrate 20, while deforming the first particles 31 therebetween so that their elastic deformation ratio or aspect ratio can be increased.

Then, the conductive connection member 30 is heated to the curing temperature of the adhesive material 33 and is cured while the pressed state illustrated in FIG. 6B is maintained.

Accordingly, the first base substrate 10 and the second base substrate 20 are adhered to each other.

The touch panel X is provided with the auxiliary electrodes 25 and 26 that are partially covered by the first wiring electrodes 23 and 24 and that are in contact with the conductive connection member 30. Further, the resistivity of the auxiliary electrodes 25 and 26 at the contact surfaces 25a and 26a in contact with the conductive connection member 30 is smaller than the resistivity of the first wiring electrodes 23 and 24 at the contact surfaces 23a and 24a in contact with the conductive connection member 30. That is, in the touch panel X, the first wiring electrodes 23 and 24 can be electrically connected to the conductive connection member 30, and therefore the first wiring electrodes 23 and 24 can be electrically connected to the first resistance film 12, using the auxiliary electrodes 25 and 26 having a relatively low resistivity. Accordingly, since, for example, am aluminum film having a small resistance while having a tendency form an oxide film on a surface thereof can be used as each of the first wiring electrodes 23 and 24, the touch panel X can be made thinner than that in which, for example, a silver paste is used as each of the first wiring electrodes 23 and 24. In the touch panel X, furthermore, stable electrical connectivity between the first wiring electrodes 23 and 24 and the first resistance film 12 can be provided.

In the touch panel X, the distance D1 from the second resistance film 22 to the contact surfaces 25a and 26a is larger than the distance D2 from the second resistance film 22 to the contact surfaces 23a and 24a. Thus, in the touch panel X, a region that is at a relatively large distance apart from the second resistance film 22 has a thickness corresponding to only that of the auxiliary electrodes 25 and 26, whereas a region that is at a relatively small distance apart from the second resistance film 22 has a large thickness because the auxiliary electrodes 25 and 26 are covered by the first wiring electrodes 23 and 24. In the touch panel X, therefore, the first base substrate 10 can be inclined in such a manner that the separation between the first base substrate 10 and the second base substrate 20 can be increased toward the side of the second resistance film 22, and therefore the Newton's ring (interference pattern) can be reduced.

In the touch panel X, the auxiliary electrodes 25 and 26 are formed along the entire regions of the first wiring electrodes 23 and 24 which are electrically connected to the first resistance film 12. In the touch panel X, therefore, variations in applied voltage to be applied to the first resistance film 12 through the auxiliary electrodes 25 and 26 and the first wiring electrodes 23 and 24 can further be reduced.

In the touch panel X, the auxiliary electrodes 25 and 26 are entirely covered by the first wiring electrodes 23 and 24 and the conductive connection member 30. In the touch panel X, therefore, the auxiliary electrodes 25 and 26 can be less likely to corrode due to the presence of moisture or the like.

In the touch panel X, the area of the contact surfaces 25a and 26a (the area of contact between the auxiliary electrodes 25 and 26 and the conductive connection member 30) is greater than or equal to the area of the contact surfaces 23a and 24a (the area of contact between the first wiring electrodes 23 and 24 and the conductive connection member 30). In the touch panel X, therefore, more stable electrical connectivity between the first wiring electrodes 23 and 24 and the first resistance film 12 can be provided.

In the touch panel X, the conductive connection member 30 includes the first particles 31, which are conductive particles. In the touch panel X, therefore, the contact resistance between the first resistance film 12, the auxiliary electrodes 25 and 26, or the first wiring electrodes 23 and 24 and the conductive connection member 30 can be reduced.

FIG. 7 is a cross-sectional view illustrating a schematic configuration of a touch panel display device Y including the touch panel X according to an embodiment of the present invention. The touch panel display device Y includes the touch panel X and a liquid crystal display device Z. In the present embodiment, the touch panel display device Y is provided with the liquid crystal display device Z as a display device. However, the display device is not limited thereto, and may be a display device that can generally be used in combination with a touch panel.

The liquid crystal display device Z includes a liquid crystal display panel 40, a backlight 50, and a housing 60.

FIG. 8 is a perspective view illustrating a schematic configuration of the liquid crystal display panel 40 of the liquid crystal display device Z. FIG. 9 is a cross-sectional view of an enlarged main part of the liquid crystal display panel 40 illustrated in FIG. 8. The liquid crystal display panel 40 includes a liquid crystal layer 41, a first base substrate 42, a second base substrate 43, and a sealing member 44. The liquid crystal display panel 40 has a display region P including a plurality of pixels for displaying an image. The display region P is formed by placing the liquid crystal layer 41 between the first base substrate 42 and the second base substrate 43 and sealing the liquid crystal layer 41 using the sealing member 44.

The liquid crystal layer 41 is a layer exhibiting an electrical, optical, mechanical, or magnetic anisotropy and including a liquid crystal having both the regularity of solid and the fluidity of liquid. Examples of such a liquid crystal may include a nematic liquid crystal, a cholesteric liquid crystal, and a smectic liquid crystal. The liquid crystal layer 41 may have spacers (not illustrated) formed of, for example, a large number of particle-shaped members in order to maintain the thickness of the liquid crystal layer 41 constant.

The first base substrate 42 includes a transparent substrate 421, a light-shielding film 422, a color filter 423, a planarizing film 424, a transparent electrode 425, and an alignment film 426.

The transparent substrate 421 plays a role of supporting the light-shielding film 422 and the color filter 423 and also sealing the liquid crystal layer 41, and has optical transparency in the direction perpendicular to the principal surface thereof. Examples of the material of the transparent substrate 421 may include optically transparent glass and optically transparent plastic.

The light-shielding film 422 plays a role of shielding light to reduce the amount of visible light transmitted, and is formed on the top surface of the transparent substrate 421. Further, the light-shielding film 422 has through-holes 422a extending therethrough in the thickness direction (the arrow AB direction) in order to transmit light. Examples of the material of the light-shielding film 422 may include dye or pigment of a color having a high light-shielding property (for example, black), carbon-added resin (for example, acryl-based resin), and Cr.

The color filter 423 plays a role of selectively absorbing a predetermined wavelength of light incident on the color filter 423 and selectively transmitting only the predetermined wavelength. Examples of the color filter 423 may include a red color filter (R) for selectively transmitting the wavelength of red visible light, a green color filter (G) for selectively transmitting the wavelength of green visible light, and a blue color filter (B) for selectively transmitting the wavelength of blue visible light. The color filter 423 is produced by adding dye or pigment to, for example, an acryl-based resin.

The planarizing film 424 plays a role of planarizing irregularities caused by arranging the color filter 423 and the like. Examples of the material of the planarizing film 424 may include transparent resins such as acryl-based resins.

The transparent electrode 425 plays a role of applying a predetermined voltage to the liquid crystal in the liquid crystal layer 41 between the transparent electrode 425 and a transparent electrode 432 of the second base substrate 43 described below, and has optical transparency in the direction perpendicular to the principal surface thereof. The transparent electrode 425 plays a role of propagating a predetermined signal (for example, an image signal or the like), and a plurality of transparent electrodes 425 are arranged so as to extend mainly in the arrow CD direction. Examples of the material of the transparent electrodes 425 may include optically transparent conductive members such as ITO and tin oxide.

The alignment film 426 plays a role of aligning liquid crystal molecules in the liquid crystal layer 41 in a predetermined direction, and is formed on the transparent electrode 425. Examples of the material of the alignment film 426 may include polyimide resin.

The second base substrate 43 includes a transparent substrate 431, the transparent electrode 432, and an alignment film 433.

The transparent substrate 431 plays roles of supporting the transparent electrode 432 and the alignment film 433 and also sealing the liquid crystal layer 41, and has optical transparency in the direction perpendicular to the principal surface thereof. The material of the transparent substrate 431 may be similar to that of the transparent substrate 421.

The transparent electrode 432 plays a role of applying a predetermined voltage to the liquid crystal in the liquid crystal layer 41 between the transparent electrode 432 and the transparent electrode 425 of the first base substrate 42, and has optical transparency in the direction perpendicular to the principal surface thereof. The transparent electrode 432 plays a role of propagating a signal (such as a scan signal) for controlling a voltage application state (ON) or voltage non-application state (OFF) to the liquid crystal layer 41, and a plurality of transparent electrodes 432 are arranged so as to extend mainly in the direction perpendicular to the plane of FIG. 9. The material of the transparent electrodes 432 may be similar to the material of the transparent electrodes 425.

The alignment film 433 plays a role of aligning the liquid crystal molecules in the liquid crystal layer 41 in a predetermined direction, and is formed on the transparent electrode 432. The material of the alignment film 433 may be similar to the material of the alignment film 426.

The sealing member 44 plays roles of sealing the liquid crystal layer 41 between the first base substrate 42 and the second base substrate 43 and bonding the first base substrate 42 and the second base substrate 43 together in such a manner that the first base substrate 42 is apart from the second base substrate 43 by a predetermined distance. Examples of the material of the sealing member 44 may include insulating resin and sealing resin.

The backlight 50 plays a role of radiating light from one side of the liquid crystal display panel 40 to the other side, and uses the edge light type. The backlight 50 includes a light source 51 and a light guide plate 52. The light source 51 plays a role of emitting light toward the light guide plate 52, and is disposed on a side of the light guide plate 52. Examples of the light source 51 may include a CFL (Cathode Fluorescent Lamp), an LED (Light Emitting Diode), a halogen lamp, a xenon lamp, and an EL (electro-luminescence). The light guide plate 52 plays a role of guiding light from the light source 51 substantially uniformly over the entire bottom surface of the liquid crystal display panel 40. The light guide plate 52 generally includes a reflection sheet, a diffusion sheet, and a prism sheet. The reflection sheet (not illustrated) plays a role of reflecting light, and is provided on the back surface. The diffusion sheet (not illustrated) plays a role of diffusing light so as to obtain more uniform planar emission of light, and is provided on the front side. The prism sheet (not illustrated) plays a role of condensing light in a substantially constant direction, and is provided on the front surface. Examples of the material of the light guide plate 52 may include transparent resins such as acrylic resin and polycarbonate resin. The backlight 50 is not limited to that of the edge light type in which, as illustrated in FIG. 7, the light source 51 is placed on a side of the light guide plate 52, and any other type such as the direct type in which the light source 51 is placed on the backside of the liquid crystal display panel 40 may be used.

The housing 60 plays a role of accommodating the liquid crystal display panel 40 and the backlight 50, and includes an upper housing 61 and a lower housing 62. Examples of the material of the housing 60 may include resins such as polycarbonate resin, metals such as aluminum, and alloys such as stainless steel (SUS).

Here, a method for fixing the touch panel X and the liquid crystal display device Z to each other using a double-sided tape T is described. The material of the fixing member used in the method for fixing the touch panel X and the liquid crystal display device Z to each other is not limited to the double-sided tape T, and, for example, an adhesive member of thermosetting resin, ultraviolet-curable resin, and the like or a fixing structure for physically fixing the touch panel X and the liquid crystal display device Z to each other may be used.

First, one side of the double-sided tape T is adhered to a predetermined region on the top surface of the upper housing 61 of the liquid crystal display device Z. In the present embodiment, as is clearly apparent in FIG. 8, the predetermined region is a region R located so as to surround the display region P of the liquid crystal display device Z.

Then, after the touch panel X is aligned with the liquid crystal display device Z to which the double-sided tape T is adhered, the transparent insulating substrate 21 of the touch panel X and the upper housing 61 of the liquid crystal display device Z are bonded to each other using the double-sided tape T.

Accordingly, the touch panel X and the liquid crystal display device Z are fixed to each other.

The touch panel display device Y according to the present invention includes the touch panel X, and can therefore achieve advantages similar to the advantages of the touch panel X described above.

While a specific embodiment of the present invention has been described, the present invention is not to be limited thereto, and a variety of modifications can be made without departing from the spirit of the invention.

As illustrated in FIG. 10, the first wiring electrodes 23 and 24 in the touch panel X may include on a surface thereof resistance layers 23R and 24R having a higher resistivity than the auxiliary electrodes 25 and 26. Further, the thickness of resistance layers 23R and 24R may be set in such a manner that, as illustrated in FIG. 10, a thickness T2 at a contact surface in contact with the auxiliary electrodes 25 and 26 can be smaller than a thickness T1 at a contact surface in contact with the conductive connection member 30. With the above configuration, due to the low resistance between the first wiring electrodes 23 and 24 and the auxiliary electrodes 25 and 26, the electrical loss between the first wiring electrodes 23 and 24 and the auxiliary electrodes 25 and 26 can be reduced. The thickness T2 of the resistance layers 23R and 24R may be set to substantially zero (that is, the state where the resistance layers 23R and 24R are not substantially present on the contact surface in contact with the auxiliary electrodes 25 and 26).

The touch panel X has a configuration in which the conductive connection member 30 includes particles of two types, namely, the first particles 31 and the second particles 32. However, the touch panel X is not limited thereto, and may have a configuration in which only the first particles 31 are included. With this configuration, it is only required to prepare particles of one type, which is suitable for reduction in cost.

The dot spacers 29 of the touch panel X may include insulating particles, which can increase the shape stability of the dot spacers 29 without unnecessarily reducing the insulating property thereof, and can maintain the functionality of the dot spacers 29 for a longer period.

In the touch panel X, the dot spacers 29 are formed on the second base substrate 20. However, the touch panel X is not limited to this configuration, and the dot spacers 29 may be formed on the first base substrate 10.

The touch panel X has a configuration in which the first particles 31 are in direct contact with the first resistance film 12. However, the touch panel X is not limited to this configuration. For example, wiring similar to that of the first wiring electrodes 23 and 24 may be formed on the transparent insulating substrate 11, and the first particles 31 and the first resistance film 12 may be electrically connected via the wiring.

In the touch panel X, a phase difference film may further be arranged on at least one of the first base substrate 10 and the second base substrate 20. The phase difference film plays a role of converting from the elliptical polarization state to a state near the linear polarization that is converted into the elliptical polarization state due to the form birefringence (phase shift) of liquid crystal or the like. Examples of the material of the phase difference film may include polycarbonate (PC), polyvinyl alcohol (PVA), polyarylate (PA), polysulfone (Psu), and polyolefin (PO). PC is preferable in view of the matching of the wavelength dispersion of liquid crystal, and PO having a smaller photoelastic coefficient than PC is preferable in view of the adaptability to a circular polarizing plate. This configuration is suitable for the increase in the contrast ratio of a displayed image.

In the touch panel X, a polarizing film may further be arranged on at least one of the first base substrate 10 and the second base substrate 20. The polarizing film plays a role of selectively transmitting light having a predetermined vibration direction. Examples of the material of the polarizing film may include iodine-containing materials. This configuration is suitable for achieving the function for shuttering light transmitted through the polarizing film.

In the touch panel X, a film subjected to an anti-glare treatment or an anti-reflection coating treatment may further be arranged on at least one of the first base substrate 10 and the second base substrate 20. With this configuration, external light reflection can be reduced.

The transparent insulating substrates 11 and 21 of the touch panel X may be replaced by any of a phase difference film, a polarizing film, and a film subjected to an anti-glare treatment or an anti-reflection coating treatment.

In the touch panel X, the conductive connection member 30 is integrally disposed so as to surround the second resistance film 22. However, the arrangement is not limited to that described above. For example, the conductive connection member 30 may be separately disposed in such a manner that after the first base substrate 10 and the second base substrate 20 are adhered to each other by applying the conductive connection member 30 to have an opening portion thereof, air or the like is injected through the opening portion, and then the opening portion is sealed using the conductive connection member 30 or a non-conductive connection member (of ultraviolet-curable resin or the like).

In the touch panel X, at least a portion of a region of the first wiring electrodes 23 and 24 except for a region connected to the conductive connection member 30 and a region located in the external conduction region 20a, and a region of the second wiring electrodes 27 and 28 except for a region located in the external conduction region 20a may be covered by an insulating member. This configuration is suitable for suppressing unwanted electrical connection between the first wiring electrodes 23 and 24 or the second wiring electrodes 27 and 28 and the first resistance film 12.

REFERENCE NUMERALS

Figure 1:
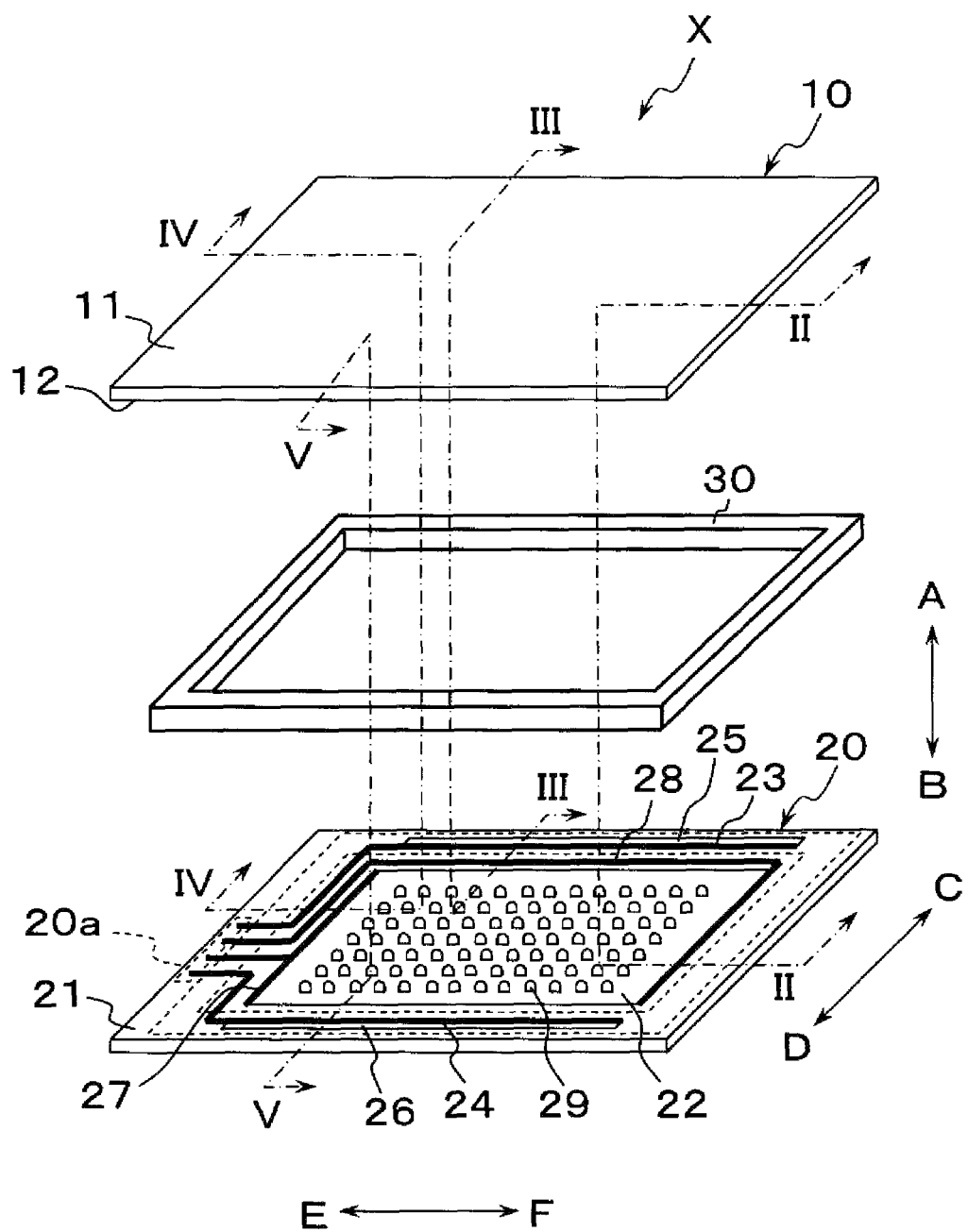
FIG. 1 is an exploded perspective view of a schematic configuration of a touch panel according to an embodiment of the present invention.
Figure 2:
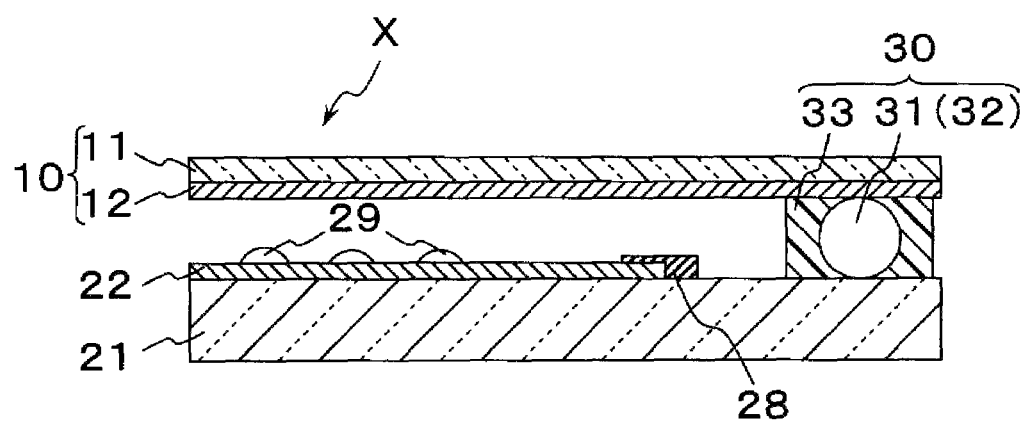
FIG. 2 is a cross-sectional view taken along the line II-II of FIG. 1.
Figure 3:
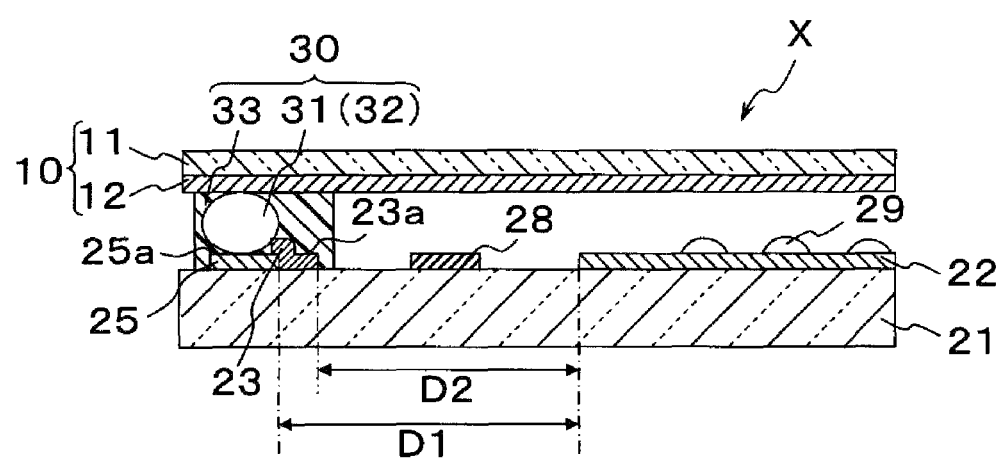
FIG. 3 is a cross-sectional view taken along the line III-III of FIG. 1.
Figure 4:
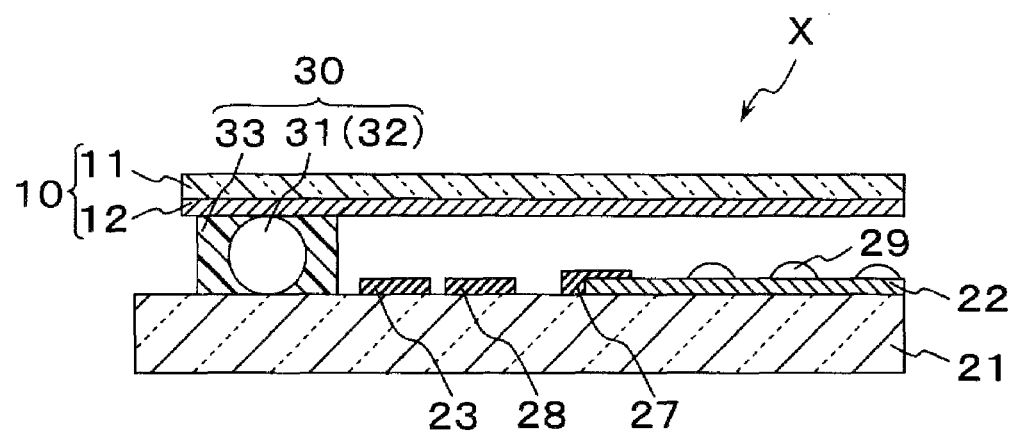
FIG. 4 is a cross-sectional view taken along the line IV-IV of FIG. 1.
Figure 5:
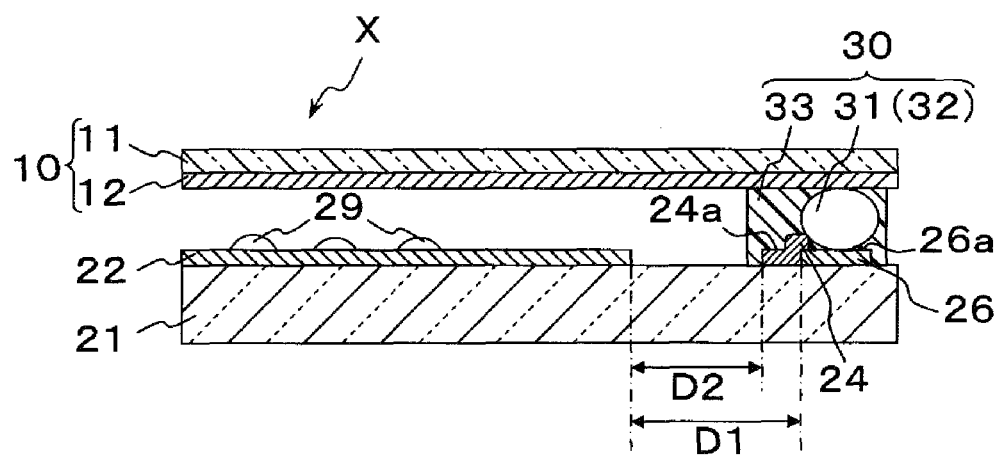
FIG. 5 is a cross-sectional view taken along the line V-V of FIG. 1.
Figure 6A:
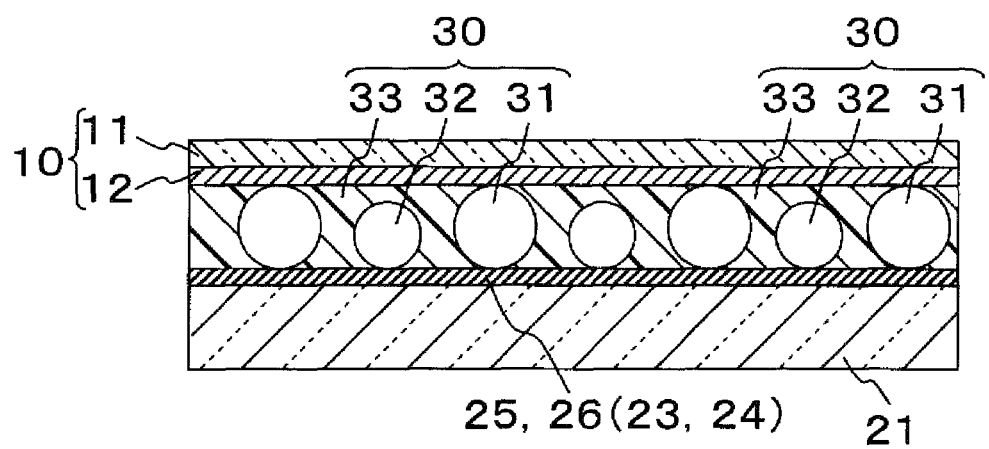
FIG. 6A is a cross-sectional view illustrating a process when a first base substrate and a second base substrate of the touch panel illustrated in FIG. 1 are adhered to each other.
Figure 6B:
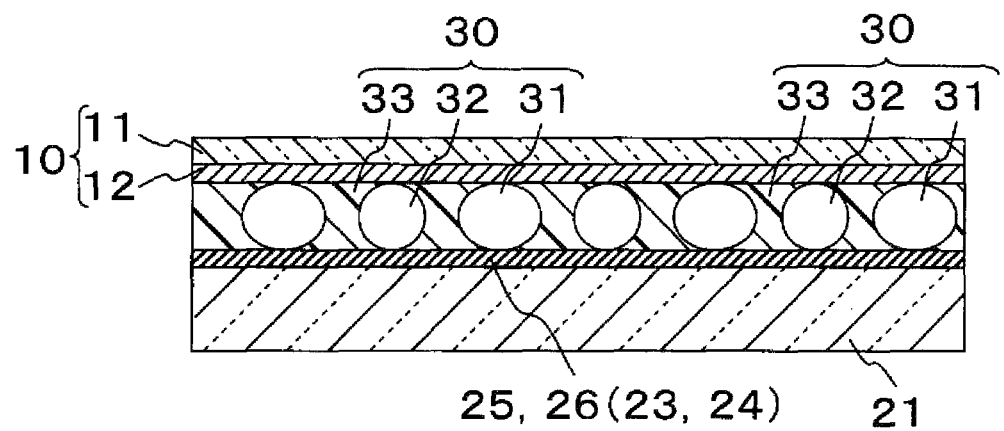
FIG. 6B is a cross-sectional view illustrating a process subsequent to that of FIG. 6A.
Figure 7:
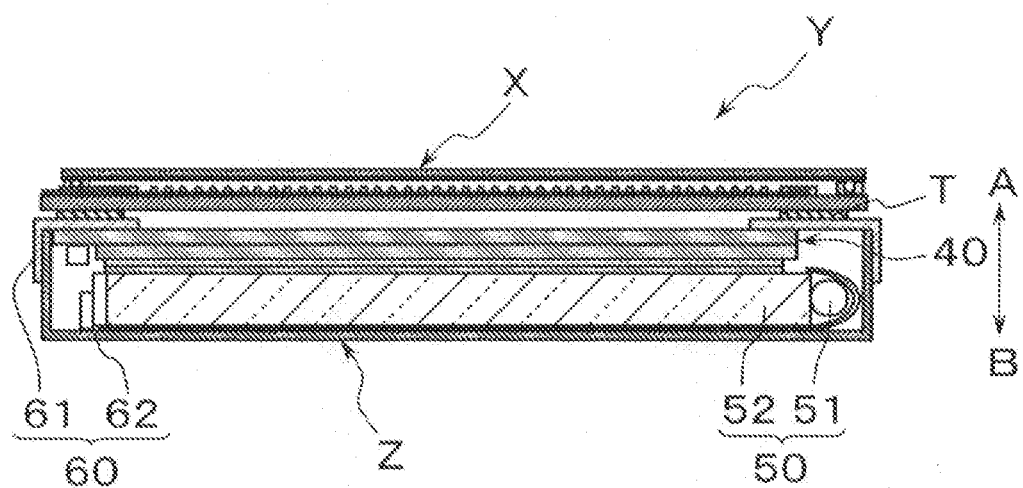
FIG. 7 is a cross-sectional view illustrating a schematic configuration of a touch panel display device including the touch panel illustrated in FIG. 1.
Figure 8:
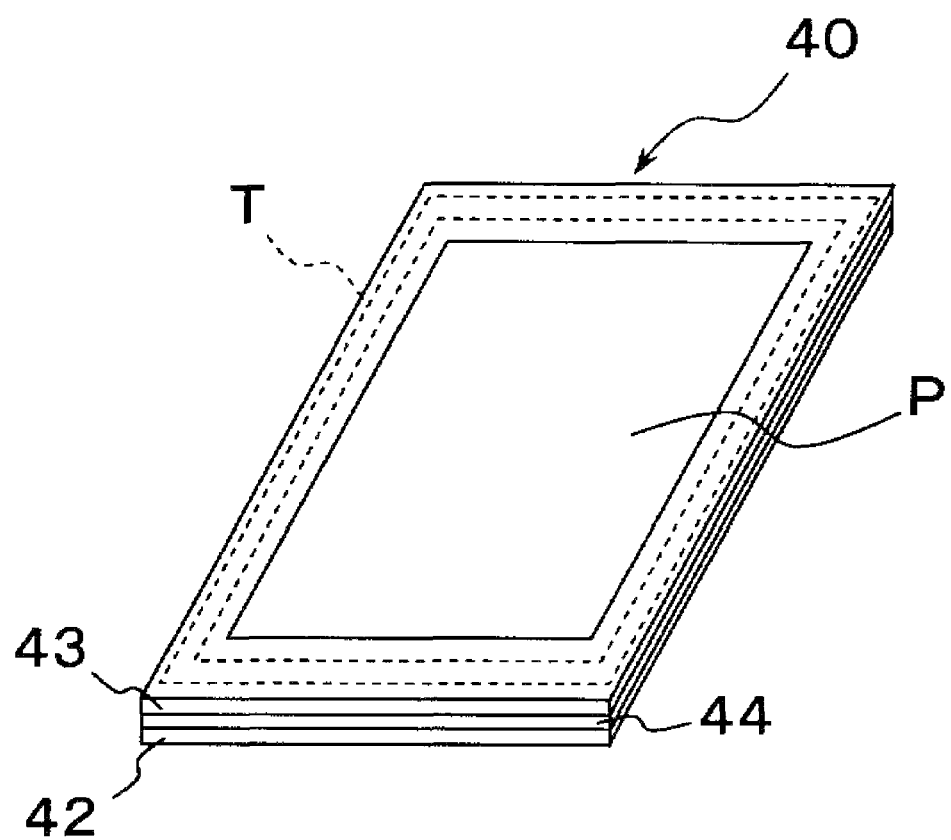
FIG. 8 is a perspective view illustrating a schematic configuration of a liquid crystal display panel in a liquid crystal display device in the touch panel display device illustrated in FIG. 7.
Figure 9:
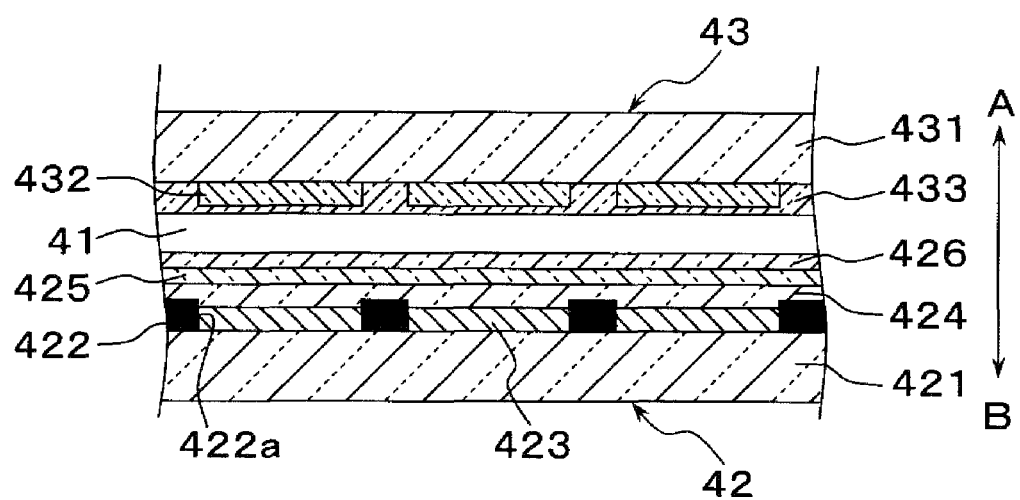
FIG. 9 is a cross-sectional view of an enlarged main part of the liquid crystal display panel illustrated in FIG. 8.
Figure 10:
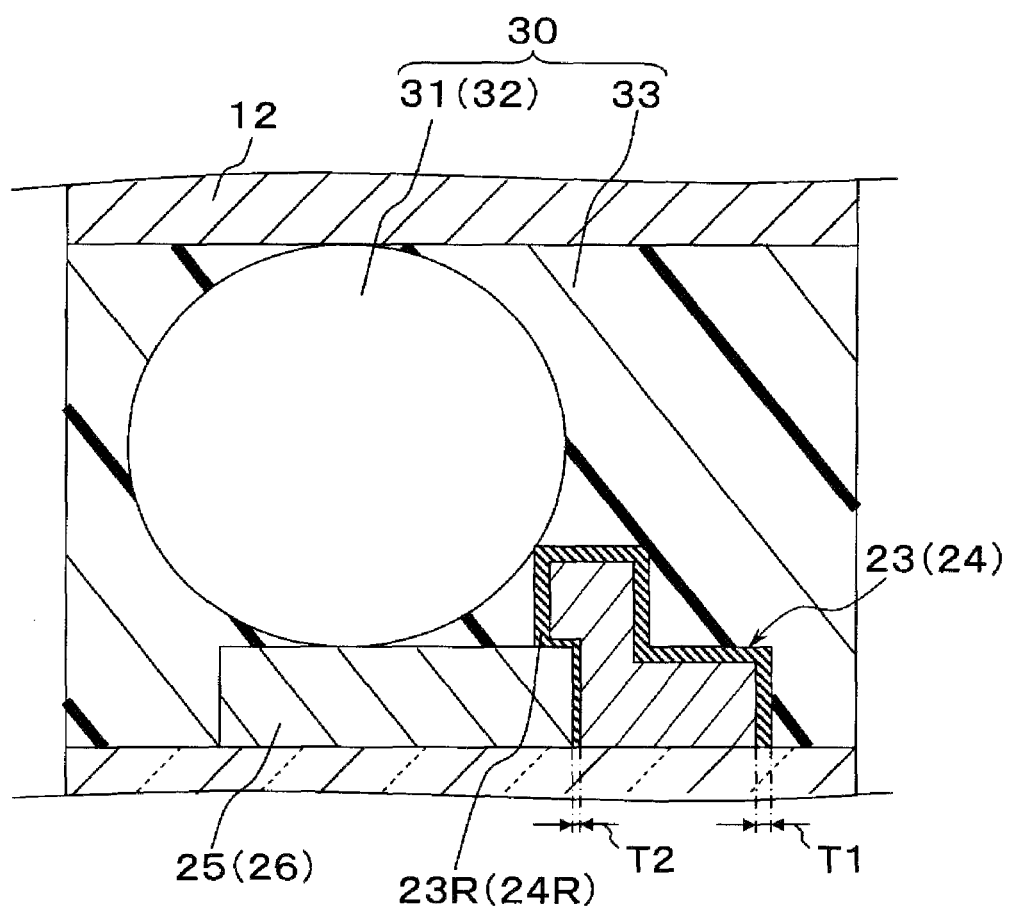
FIG. 10 is an enlarged view of a main part illustrating a schematic configuration of a touch panel according to another embodiment of the present invention.

X touch panel
Y touch panel display device
Z liquid crystal display device
10 first base substrate
11 transparent insulating substrate
12 first resistance film
20 second base substrate
21 transparent insulating substrate
22 second resistance film
23, 24 first wiring electrode (wiring electrode)
23a, 24a contact surface
23R, 24R resistance layer
25, 26 auxiliary electrode
25a, 26a contact surface
27, 28 second wiring electrode
29 dot spacer
30 conductive connection member
31 first particle
32 second particle
33 adhesive material
40 liquid crystal display panel
50 backlight
60 housing

The invention claimed is:

1. A touch panel comprising:
a first base substrate comprising:
a first member; and
a first resistance film on the first member;
a second base substrate comprising:
a second member; and
a second resistance film located on the second member, and facing the first resistance film;
a wiring electrode located on the second member;
a conductive connection member that is disposed between the first base substrate and the second base substrate and that electrically connects the first resistance film to the wiring electrode; and
an auxiliary electrode that is partially covered by the wiring electrode and that is in contact with the conductive connection member,
wherein a resistivity of the auxiliary electrode is smaller than a resistivity of the wiring electrode, and
wherein the wiring electrode comprises on a surface thereof a resistance layer having a higher resistivity than the auxiliary electrode, and
wherein a thickness of the resistance layer is smaller on the contact surface in contact with the auxiliary electrode than on the contact surface in contact with the conductive connection member.

2. The touch panel according to claim 1, wherein the auxiliary electrode is formed along an entire region of the wiring electrode which is electrically connected to the first resistance film.

3. The touch panel according to claim 1, wherein the auxiliary electrode is entirely covered by the wiring electrode and the conductive connection member.

4. The touch panel according to claim 1, wherein an area of contact between the auxiliary electrode and the conductive connection member is greater than or equal to an area of contact between the wiring electrode and the conductive connection member.

5. The touch panel according to claim 1, wherein the auxiliary electrode is made of the same material as a material of the second resistance film.

6. A touch panel comprising:
a first base substrate comprising:
a first member; and
a first resistance film on the first member;
a second base substrate comprising:
a second member;
a second resistance film which is located on the second member and which is facing the first resistance film; and
a wiring electrode located on the second member;
a conductive connection member that is disposed between the first base substrate and the second base substrate; and
an auxiliary electrode in direct contact with the wiring electrode, the auxiliary electrode located on the second member, the auxiliary electrode electrically connected to the first resistance film through the conductive connection member, and the auxiliary electrode having a resistivity smaller than that of the wiring electrode.

7. The touch panel according to claim 6, wherein the wiring electrode comprises:
a body; and
a layer on a surface of the body, having a resistivity higher than that of the auxiliary electrode.

8. The touch panel according to claim 7, wherein the layer comprises:
a first part in contact with the auxiliary electrode; and
a second part in contact with the conductive connection member,
wherein the first part is thinner than the second part.

9. The touch panel according to claim 6, wherein both the auxiliary electrode and the wiring electrode are in contact with the conductive connection member.

10. The touch panel according to claim 9, wherein an area of contact between the auxiliary electrode and the conductive connection member is greater than or equal to an area of contact between the wiring electrode and the conductive connection member.

11. The touch panel according to claim 6, wherein a part of the auxiliary electrode is located between the second member and the wiring electrode.

12. The touch panel according to claim 11, wherein a first position where the wiring electrode is located is closer to a central portion of the second member than a second position where the auxiliary electrode is located.

13. The touch panel according to claim 6, wherein the auxiliary electrode is formed along an entire region of the wiring electrode which is electrically connected to the first resistance film.

14. The touch panel according to claim 6, wherein the auxiliary electrode is entirely covered by the wiring electrode and the conductive connection member.

15. The touch panel according to claim 6, wherein the auxiliary electrode is made of the same material as a material of the second resistance film.

16. The touch panel according to claim 6, wherein the auxiliary electrode is made of indium tin oxide.

17. The touch panel according to claim 6, wherein the conductive connection member comprises conductive particles.

18. The touch panel according to claim 6, wherein a main body of the wiring electrode is formed of a metal thin film.

19. The touch panel according to claim 18, wherein the metal thin film comprises an aluminum film, an aluminum alloy film, a multilayer film of a chromium film and an aluminum film, or a multilayer film of a chromium film and an aluminum alloy film.

20. A touch panel display device comprising a display panel, and the touch panel according to claim 6, in which the first base substrate or the second base substrate faces the display panel.

* * * * *